United States Patent
Galiano et al.

[15] 3,637,426
[45] Jan. 25, 1972

[54] METHOD FOR PREPARING COMPOSITE FILMS OF POLYVINYLIDENE CHLORIDE AND ETHYLENE-ACRYLAMIDE COPOLYMERS

[72] Inventors: Francis R. Galiano, Prairie Village; David Rankin, Kansas City, both of Kans.

[73] Assignee: Gulf Research & Development Company, Pittsburgh, Pa.

[22] Filed: Aug. 1, 1968

[21] Appl. No.: 749,306

[52] U.S. Cl............117/138.8UA, 117/138.8 E, 117/161 UF
[51] Int. Cl........................................................B32b 27/08
[58] Field of Search..............117/122 H, 161 UF, 138.8 UA, 117/138.8 E; 161/254

[56] References Cited

UNITED STATES PATENTS

| | | | |
|---|---|---|---|
| 3,022,198 | 2/1962 | Hahn | 117/138.8 U |
| 3,322,614 | 5/1967 | Seiferth et al | 161/411 |
| 3,337,517 | 8/1967 | Anspon | 260/88.1 |
| 3,353,990 | 11/1967 | Vieth et al. | 117/138,8 U |
| 3,353,992 | 11/1967 | Grenley et al | 117/138.8 U |
| 3,483,022 | 12/1969 | Hullot | 117/122 H |

*Primary Examiner*—William D. Martin
*Assistant Examiner*—Ralph Husack
*Attorney*—Richard L. Kelly, Carl A. Cline, Forrest D. Stine and Richard A. Anderson

[57] ABSTRACT

A composite thermoplastic film of polyvinylidene chloride and copolymers of ethylene and amides of lower alkyl acrylates and their homologs is prepared without primer or adhesive by coating a film of the ethylene-amide copolymer with the polyvinylidene chloride.

1 Claims, No Drawings

METHOD FOR PREPARING COMPOSITE FILMS OF POLYVINYLIDENE CHLORIDE AND ETHYLENE-ACRYLAMIDE COPOLYMERS

BACKGROUND OF INVENTION

This invention relates to a composite thermoplastic film of polyvinylidene chloride on ethylene-acrylamide and a method for preparing such composite films without using primer or adhesive.

The many superior qualities of polyvinylidene chloride (PVDC) film are well known. The barrier properties of this material to gasses such as oxygen, carbon dioxide, and water are outstanding. Commercially, these barrier properties are most often used in composite structures in order to obtain films having barrier and other desirable properties such as strength, stiffness, and heat seal. Composites of PVDC-cellophane and PVDC-polypropylene are used for snack food packaging. Composite films of PVDC-polyethylene, PVDC-nylon and PVDC-nylon-polyethylene are common packaging materials for meats and cheese. However, in most cases it is not possible to prepare composite structures containing PVDC without the use of primer or adhesive coating because of the poor adhesion of the PVDC to other plastic substrates. For example, see U.S. Pat. No. 3,231,411 to Tyler.

U.S. Pat. No. 3,322,614 to Seiferth discloses a laminate of PVDC with another film, wherein the PVDC is supercooled just after extrusion and just before contact with the other film.

SUMMARY

It has been discovered that composite films of PVDC and an ethylene-acrylamide copolymer can be prepared without the use of an adhesive interlayer or primer. A PVDC coating can be applied as an emulsion or solution on a preformed ethylene-acrylamide copolymer film, and the resulting composite cannot be separated by normal physical means. The barrier properties of the ethylene-acrylamide copolymer are quite similar to those of polyethylene. However, the copolymer does possess physical properties superior to those of low density polyethylene, including better stiffness, tensile, hardness, and abrasion resistance. The composite film, therefore, combines the better physical properties of the ethylene-acrylamide copolymer with the excellent barrier properties of the PVDC.

The ethylene-acrylamide copolymers which make up a portion of this composite structure are disclosed in U.S. Pat. No. 3,337,517 issued Aug. 22, 1967 to H. D. Anspon.

DESCRIPTION OF PREFERRED EMBODIMENTS

An ethylene-methacrylamide copolymer was prepared by the method of U.S. Pat. No. 3,337,517 by heating a copolymer of ethylene containing 41 percent by weight of methyl methacrylate, having a melt index of one thousand, with excess ammonium hydroxide containing a catalytic amount of caustic in a stirred autoclave. The product contained approximately 80 mol percent amide and 20 mol percent acid of converted methyl methacrylate, based on the original methyl methacrylate content.

The ethylene-methacrylamide copolymer was made into film in two ways—by compression molding at 200° F., and by casting from a 15 percent solution of copolymer in tetrahydrofuran. The preferred method is to extrude the ethylene-acrylamide copolymer by conventional means. Cast films were dried at temperatures between 25° C. and 125° C. The ethylene-acrylamide copolymer films were overcoated directly with polyvinylidene chloride (Daran 220, an aqueous emulsion of polyvinylidene chloride containing about 61 percent solids Dewey and Almy Chemical Division, W. R. Grace & Co.) using a No. 8 Mayer rod (wire wound rod) and dried in an air oven at 60° to 100° for 2 minutes to 10 minutes.

Adhesion was checked by the well-known scotch tape test. The PVDC overcoat was crosshatched with a razor blade and scotch tape applied firmly over the cut area. The tape was pulled off with a sudden jerking motion; no failures were noted.

The entire specification and claims of U.S. Pat. No. 3,337,517 issued Aug. 22, 1967 are herein incorporated by reference.

We claim:

1. A method for preparing a composite thermoplastic film, consisting of a substrate of a copolymer of ethylene and a monomer selected from the group consisting of acrylamide and methacrylamide coated with a film of a homopolymer of vinylidene chloride, which consists essentially of directly coating an aqueous emulsion of a homopolymer of vinylidene chloride on at least one surface of a film of a copolymer of ethylene and a monomer selected from the group consisting of acrylamide and methacrylamide, said surface being free of any primer or adhesive coating, and thereafter heating said coated film to evaporate the water from the polyvinylidene chloride emulsion and directly bonding the homopolymer of vinylidene chloride to said surface of said film of the copolymer of ethylene and a monomer selected from the group consisting of acrylamide and methacrylamide.

* * * * *